United States Patent [19]
Carlblom et al.

[11] Patent Number: 5,728,439
[45] Date of Patent: Mar. 17, 1998

[54] MULTILAYER PACKAGING MATERIAL FOR OXYGEN SENSITIVE FOOD AND BEVERAGE

[75] Inventors: Leland H. Carlblom, Richland Township, Allegheny County; Jerome A. Seiner, Pittsburgh; Ken W. Niederst, Hampton Township, Allegheny County, all of Pa.

[73] Assignee: PPG Industries, Inc., Pittsburgh, Pa.

[21] Appl. No.: 759,905

[22] Filed: Dec. 4, 1996

[51] Int. Cl.$^6$ .................. B29D 22/00; B32B 1/02; B32B 27/08; B65D 23/08
[52] U.S. Cl. .................. 428/36.91; 229/87.01; 383/113; 383/116; 428/413; 428/414; 428/480; 523/428; 523/440; 523/443; 525/486; 525/523; 525/526; 528/99; 528/123; 528/124; 528/366; 528/405; 528/407
[58] Field of Search .................. 229/87.01; 383/113, 383/116; 428/36.91, 413, 414, 480; 523/428, 440, 443; 525/486, 523, 526; 528/99, 123, 124, 366, 405, 407

[56] References Cited

U.S. PATENT DOCUMENTS

| | | | |
|---|---|---|---|
| 2,500,600 | 3/1950 | Bradley | 260/47 |
| 2,640,037 | 5/1953 | Parry et al. | 260/42 |
| 2,651,589 | 9/1953 | Shokal et al. | 154/140 |
| 2,830,721 | 4/1958 | Pinsky et al. | 215/1 |
| 2,909,448 | 10/1959 | Schroeder | 117/141 |
| 3,129,133 | 4/1964 | Doyle et al. | 162/164 |
| 3,256,239 | 6/1966 | Williamson et al. | 260/47 |
| 3,294,574 | 12/1966 | Salame | 117/94 |
| 3,337,609 | 8/1967 | Williamson et al. | 260/482 |
| 3,393,087 | 7/1968 | Kamp et al. | 117/26 |
| 3,399,162 | 8/1968 | Salame | 260/33.2 |
| 3,463,350 | 8/1969 | Unger | 220/83 |
| 3,496,138 | 2/1970 | Sellers et al. | 260/47 |
| 3,553,283 | 1/1971 | Doss | 260/830 |
| 3,683,044 | 8/1972 | Huang et al. | 260/830 TW |
| 3,843,479 | 10/1974 | Matsunami et al. | 161/165 |
| 3,963,663 | 6/1976 | Sekmakas | 260/29.3 |
| 4,093,594 | 6/1978 | Anderson | 260/47 EP |
| 4,116,900 | 9/1978 | Belanger | 260/18 EP |
| 4,133,802 | 1/1979 | Hachiboshi et al. | 528/502 |
| 4,246,148 | 1/1981 | Shimp et al. | 260/18 EP |
| 4,367,328 | 1/1983 | Bertram et al. | 528/98 |
| 4,423,166 | 12/1983 | Moriarity et al. | 523/414 |
| 4,444,937 | 4/1984 | Badertscher | 524/425 |
| 4,482,695 | 11/1984 | Barbee et al. | 528/208 |
| 4,486,507 | 12/1984 | Schumacher | 428/476.1 |
| 4,501,879 | 2/1985 | Barbee et al. | 528/288 |
| 4,507,363 | 3/1985 | Chow et al. | 428/418 |
| 4,528,219 | 7/1985 | Yamada et al. | 428/35 |
| 4,528,235 | 7/1985 | Sacks et al. | 428/220 |
| 4,536,425 | 8/1985 | Hekal | 428/35 |
| 4,540,750 | 9/1985 | Ham | 525/504 |
| 4,541,958 | 9/1985 | Miyamoto et al. | 260/404.5 |
| 4,568,580 | 2/1986 | Ghirardello et al. | 428/35 |
| 4,605,765 | 8/1986 | Miyamoto et al. | 564/367 |
| 4,607,073 | 8/1986 | Sakashita et al. | 524/404 |
| 4,618,528 | 10/1986 | Sacks et al. | 428/216 |
| 4,640,973 | 2/1987 | Davis et al. | 528/208 |
| 4,673,764 | 6/1987 | Bertram et al. | 564/155 |
| 4,673,765 | 6/1987 | Bertram et al. | 564/155 |
| 4,704,437 | 11/1987 | Kiessling | 525/327.3 |
| 4,719,135 | 1/1988 | Gerdes et al. | 428/35 |
| 4,721,799 | 1/1988 | Newman-Evans | 549/552 |
| 4,725,457 | 2/1988 | Ward et al. | 427/385.5 |
| 4,741,936 | 5/1988 | Nohara et al. | 428/35 |
| 4,800,129 | 1/1989 | Deak | 428/474.4 |

(List continued on next page.)

FOREIGN PATENT DOCUMENTS

| | | |
|---|---|---|
| 2071058 | 6/1992 | Canada. |
| 2071177 | 12/1992 | Canada. |
| 44816 | 1/1982 | European Pat. Off.. |
| 327039 | 8/1989 | European Pat. Off.. |
| 590263 A2 | 4/1994 | European Pat. Off.. |
| 1136350 | 12/1968 | United Kingdom. |
| 1258454 | 12/1971 | United Kingdom. |

OTHER PUBLICATIONS

Epoxy Resins, Chemistry and Technology, Second Edition, Copyright 1988 by Marcel Dekker, Inc., pp. 719, 745.
Formulating Amine–Cured Coatings With Epon Resins, p. 17.
Gas Barrier Improvement Using Vermiculite and Mica in Polymer Films, W. J. Ward, et al. 1990, pp. 173–180.
Handbook of Epoxy Resins, Henry Lee and Kris Neville, Copyright 1967, pp. 7–1, 7–2, 7–30.
Horiba, Laser Scattering Particle Size Distribution Analyzer LA–900, pp. 1–7.
Protective Coatings, Fundamentals of Chemistry and Composition, Clive H. Hare, pp. 187, 222.
Surface Coatings, vol. 1–Raw Materials and Their Usage, Prepared by the Oil and Colour Chemists' Association, Australia, 1983. pp. 120, 123.

*Primary Examiner*—Robert E. Sellers
*Attorney, Agent, or Firm*—Paul S. Chirgott

[57] ABSTRACT

Disclosed is a multilayer packaging material which is suitable for use as a container for malt beverages and which is tinted so as to block at least 90% of light with wavelengths of electromagnetic radiation ranging from 300 nm to 500 nm. The tinted multilayer packaging materials of the present invention includes: (a) at least one layer of a carbon dioxide ($CO_2$)-permeable polymeric packaging material, and (b) at least one layer of a $CO_2$-treated gas barrier coating, which has an oxygen permeability constant not more than 0.05 cubic centimeter-mil/100 square inches/atmosphere/day. The $CO_2$-permeable packaging material can be any polymeric material through which $CO_2$ can pass and which can be used as a packaging material for food or beverages. The gas barrier coating has an oxygen permeability constant, before $CO_2$ treatment, of less than 0.3. This gas barrier coating includes the reaction product of a polyamine (A) and a polyepoxide (B). The polyamine (A) can be an initial polyamine or an ungelled polyamine adduct having active amine hydrogens. Polyepoxide (B) can be a polyepoxide having a plurality of glycidyl groups linked to an aromatic member.

24 Claims, No Drawings

U.S. PATENT DOCUMENTS

| | | | |
|---|---|---|---|
| 4,818,782 | 4/1989 | Bissot | 524/413 |
| 4,826,955 | 5/1989 | Akkapeddi et al. | 528/324 |
| 4,871,867 | 10/1989 | Hidaka et al. | 549/514 |
| 4,891,408 | 1/1990 | Newman-Evans | 525/113 |
| 4,908,272 | 3/1990 | Harada et al. | 428/412 |
| 4,952,628 | 8/1990 | Blatz | 525/58 |
| 4,960,639 | 10/1990 | Oda et al. | 428/34.5 |
| 4,983,432 | 1/1991 | Bissot | 428/35.7 |
| 4,983,719 | 1/1991 | Fox et al. | 528/339 |
| 5,006,381 | 4/1991 | Nugent, Jr. et al. | 428/35.4 |
| 5,008,137 | 4/1991 | Nugent, Jr. et al. | 428/35.4 |
| 5,028,462 | 7/1991 | Matlack et al. | 428/35.7 |
| 5,110,855 | 5/1992 | Blatz | 524/441 |
| 5,153,039 | 10/1992 | Porter et al. | 428/36.92 |
| 5,196,481 | 3/1993 | Owens et al. | 525/108 |
| 5,244,729 | 9/1993 | Harrison et al. | 428/331 |
| 5,244,960 | 9/1993 | Swarup et al. | 524/512 |
| 5,637,365 | 6/1997 | Carlblom | 525/523 |

MULTILAYER PACKAGING MATERIAL FOR OXYGEN SENSITIVE FOOD AND BEVERAGE

BACKGROUND OF THE INVENTION

The technical field of the present invention relates to packaging materials, and more specifically to multilayer packaging materials having at least one layer of a gas-permeable substrate and at least one layer of a gas barrier coating.

Plastics have found increasing use as replacements for glass and metal containers in packaging. Advantages of such plastic packaging over glass packaging include lighter weight, decreased breakage and potentially lower costs. Moreover, an advantage of plastic packaging over metal packaging is that the former can more easily be designed as re-closable. Notwithstanding the above, shortcomings in the gas barrier properties of common plastic packaging materials (e.g., polyesters, polyolefins and polycarbonates) present major problems to those in the packaging industry when such materials are used to package oxygen-sensitive items and/or carbonated beverages.

Specifically, gases such as oxygen and carbon dioxide can readily permeate through most of the plastic materials commonly used by the packaging industry. The oxygen permeability constant (herein referred to as "OPC") of such plastic materials quantifies the amount of oxygen which can pass through a film or coating under a specific set of circumstances and is generally expressed in units of cubic centimeter-mil/100 square inches/atmosphere/day. This is a standard unit of permeation measured as cubic centimeters of oxygen permeating through 1 mil (25.4 micron) thickness of a sample, 100 square inches (645 square centimeters) in area, over a 24-hour period, under a partial pressure differential of one atmosphere at specific temperature and relative humidity (R.H.) conditions. As used herein, OPC values are reported at 30° C. and 50% R.H. unless otherwise stated.

Since many foods, beverages, chemicals, medicines, medical supplies and the like are sensitive to oxidation, they typically must be protected from the ingress of oxygen into the container in which they are stored so as to prevent their discoloration and/or spoilage. Moreover, carbonated beverages should also be stored in sealed containers which prevent the egress of carbon dioxide therefrom so as to prevent the beverage from going flat. As used herein, the term "flat" refers to a carbonated beverage losing at least about 10% of its carbonation, typically at least about 15% of its carbonation, and more typically at least about 20% of its carbonation. Accordingly, since oxygen and carbon dioxide can readily permeate through most plastic materials used by the packaging industry, the shelf-life of items stored in conventional plastic containers is reduced when compared to their shelf-life when stored in glass or metal containers.

Some examples of oxygen sensitive items whose shelf-life would be greatly reduced if stored in conventional plastic containers are perishable foods and beverages such as tomato-based products (e.g., ketchup, tomato sauces and tomato pastes), juices (e.g., fruit and vegetable juices) and carbonated alcoholic beverages (e.g., beer, ale, malt beverages, sparkling wines, champagnes, and the like). In these instances, exposure to minute amounts of oxygen over a relatively short period of time can adversely affect their taste. Some examples of carbonated beverages whose shelf-life would be greatly reduced if stored in conventional plastic containers are soft drinks, malt beverages, sparkling water, sparkling wines, champagne, and the like.

One of the common packing materials used today by the food and beverage industry is poly(ethylene teraphthalate) ("PET"). Notwithstanding its widespread use, PET has a relatively high OPC value (i.e., about 6.0). As such, the food and beverage packaging industry has sought ways to improve the OPC value of such packaging materials. It should be noted that, typically, oxygen permeates through a film and/or coating more readily than does carbon dioxide. Accordingly, although OPC values pertain to the permeability of oxygen through a film and/or coating, lowering a coating's OPC value improves not only its oxygen barrier properties, but also its carbon dioxide barrier properties.

One of the methods disclosed in the literature as a means of improving a plastic packaging material's OPC value pertains to chemically and/or physically modifying the plastic. This method is typically expensive and can create recycleability problems. Another method disclosed in the literature as a means of improving a plastic packaging material's OPC value pertains to coating the plastic material with a gas barrier material (e.g., a gas barrier coating composition or a gas-barrier film). This method is typically less expensive than that set out above and creates fewer, if any, recycleability problems.

Numerous gas barrier coating compositions have been disclosed in the prior art. For example, polyepoxide-polyamine based gas barrier coating compositions having very low OPC values are the subject of commonly-owned U.S. Pat. Nos. 5,006,381; 5,008,137 and 5,300,541 and WO 95/26997. These coatings have found commercial acceptance as barrier coatings for application over conventional polymeric containers. However, further improvements are still desirable by certain segments in the packaging industry. An example of such an improvement would include the development of gas barrier coatings that have OPC values of less than 0.06 and a smooth and glossy appearance.

For example, the malt beverage industry has established very strict quality standards for small beverage containers (e.g., 12 ounce (355 milliliter) bottles made out of PET having an average wall thickness of 15 mils (381 microns)). According to this shelf-life standard, typically not more than 5 ppm of oxygen should pass through the walls of the sealed container over a 90-day storage period at ambient temperatures and 50% R.H. Parts per million of oxygen is based upon the weight of oxygen to the weight of the beverage (1 cubic centimeter of oxygen weighs 0.0014 gram). For example, one cubic centimeter of oxygen in 12 ounces of beverage would be 4.0 ppm ((0.0014 grams per cubic centimeter of oxygen/355 cubic centimeters in a 12 ounce bottle)$\times 10^6$). Preferred levels of performance for the malt beverage industry would entail that, over the 90-day storage period at ambient temperatures and 50% R.H., not more than 4 ppm oxygen, more preferably not more than 3 ppm oxygen, and even more preferably not more than 2 ppm of oxygen pass through the walls of the sealed container.

One way in which a polymeric packaging material comprising PET can meet the aforementioned malt beverage industry shelf-life standard of allowing not more than 5 ppm of oxygen from passing through its walls over a 90-day period when stored at ambient temperatures and 50% R.H., is to coat the packaging material with a gas barrier coating which has an OPC value of not more than 0.05. Moreover, a way in which a polymeric packaging material comprising PET can meet the preferred malt beverage industry standard of allowing not more than 4 ppm of oxygen, more preferably not more than 3 ppm of oxygen, and the even more preferably not more than 2 ppm of oxygen from passing through the gas barrier coating over a 90-day period when stored at ambient temperatures and 50% R.H., is to coat the packaging material with a gas barrier coating which has an OPC value of not more than 0.04, more preferably of not more than 0.03, and even more preferably of not more than 0.02, respectively. Notwithstanding the advantages associated with using polymeric materials for making malt beverage containers, for reasons such as high cost, insufficient OPC values, and/or poor appearance of conventional gas barrier coatings, the malt beverage industry continues to make malt beverage containers out of glass and/or metal.

It is known that malt beverages are not stable in light with wavelengths of electromagnetic radiation ranging from 300 nanometers (nm) to 500 nm (hereinafter referred to as "product damaging light"). It is also known that brown or dark amber-tinted glass substantially blocks most of this product damaging light. As used herein, the term "substantially blocks" means that less than about 10%, preferably less than about 7%, more preferably less than about 5% and even more preferably less than about 3% of this product damaging light passes there through.

SUMMARY OF THE INVENTION

The present invention provides a multilayer packaging material which is suitable for use as a container for malt beverages and which is tinted so as to block at least 90% of light with wavelengths of electromagnetic radiation ranging from 300 nm to 500 nm. The tinted multilayer packaging materials of the present invention include: (a) at least one layer of a gas-permeable, polymeric packaging material through which carbon dioxide ($CO_2$) can pass, and (b) at least one layer of a $CO_2$ treated gas barrier coating. When practicing this invention, the gas-permeable packaging material, the $CO_2$-treated gas barrier coating or both are tinted.

The gas barrier coating used when practicing this invention typically has an OPC value, before $CO_2$ treatment, of not more than 0.3. This gas barrier coating includes the reaction product of a polyamine (A) and an polyepoxide (B). Polyamine (A) includes at least one of the following: (a) an initial polyamine, or (b) an ungelled polyamine adduct. Polyepoxide (B) includes a polyepoxide having a plurality of glycidyl groups linked to an aromatic member. The cured and $CO_2$-treated gas barrier coating used when practicing this invention has an OPC value of not more than 0.05.

DETAILED DESCRIPTION OF THE INVENTION

As used herein, the term "malt beverage industry" refers to the industry which manufactures, processes and/or distributes carbonated malt beverages such as beer, malt liquor, ale, and the like.

A desired OPC value for a target storage time is calculated by Equation (A):

$$t = O_i(3a)^{-1}(L_1/P_1 + L_2/P_2 + \ldots + L/P_n) \quad (A)$$

where:

t=desired storage time in days;

$O_i$=desired maximum level of oxygen ingress through the walls of a sealed multilayer container, in ppm;

a=ratio of exterior surface area of the multilayer container, in square inches, to internal volume ratio of the container, in cubic centimeters;

L=average thickness of each layer of the multilayer container, in mils; and

P=OPC value of each individual layer of the multilayer container.

For example, if a 0.3 mil (7.6 micron) thick gas barrier coating is to be coated over a typical 12 ounce (355 milliliter) beverage bottle made out of PET, and if it is desired that not more than 5 ppm of oxygen permeate through the walls of the sealed, coated bottle after 90 days of storage at 30° C. and 50% R.H., the necessary minimum OPC value of the gas barrier coating to achieve this desired result can be calculated by using Equation A. Specifically, in this example, a typical 12 ounce (355 milliliter) beverage bottle made out of PET has an internal volume of 355 cubic centimeters, a surface area of 49 square inches (35.6 square centimeters) and an average wall thickness of 15 mils (381 microns). Moreover, uncoated PET has an OPC value of 6.0. When plugging this data into Equation A: t is 90 days; $O_i$ is 5 ppm; a is 49 square inches/355 cubic centimeters; $L_1$ is 15 mils; $L_2$ is 0.3 mil; and $P_2$ is 6.0. Accordingly, solving Equation A for $P_2$ (i.e., the target OPC value for the gas barrier coating needed to achieve the desired result at 30° C. and 50% R.H.) yields 0.06.

The multilayer packaging material of the present invention includes: (a) at least one layer of a gas-permeable polymeric packaging material, and (b) at least one layer of a $CO_2$-treated gas barrier coating. In the practice of this invention, $CO_2$ treatment of the gas barrier coating is used to achieve the desired OPC values.

When practicing this invention, the gas-permeable packaging material can be any suitable polymeric material through which $CO_2$ can pass. Typically, the gas-permeable packaging material has an OPC value greater than 0.5. Examples of such suitable gas-permeable polymeric packaging materials include: polyesters, polyolefins, polyamides, cellulosics, polystyrenes, and polyacrylics, and the like.

In embodiments of this invention wherein a polyolefin (e.g., polypropylene) is the gas-permeable packaging material, the surface of the polyolefin is preferably treated to increase surface tension and promote better adhesion of the gas barrier material to the polyolefin material. Examples of treating techniques which can be used for this purpose include: flame-treating, corona-treating and the like.

Specific examples of such treating techniques are described in detail by Pinner et al. in *Plastics: Surface and Finish*, Butterworth & Co. Ltd. (1971), Chapter 3. The description of the surface treatments described in Pinnet et al is herein incorporated by reference.

Due to their physical properties, the preferred polymeric packaging materials comprise a polyester. Examples of polyesters which can be used for this purpose include: PET, and/or poly(ethylene napthalate) ("PEN").

The gas barrier coating used when practicing this invention typically has an OPC value, before treatment with $CO_2$, of not more than about 0.30. Preferably, its OPC value, prior to $CO_2$ treatment, is not more than about 0.25, more preferably not more than about 0.20, and even more preferably not more than about 0.15.

In accordance with this invention, $CO_2$ treatment typically occurs after the gas barrier coating has been applied onto the gas-permeable layer and cured. The extent of $CO_2$ treatment necessary for the gas barrier coating to obtain the desired OPC value depends upon factors such as the coating's OPC value prior to any $CO_2$ treatment and the duration, temperature and $CO_2$ pressure during the $CO_2$ treatment process.

In one embodiment, after the gas barrier coating is coated over the gas-permeable packaging material, it is exposed to a $CO_2$ atmosphere at an elevated pressure and temperature.

During such a treatment process, $CO_2$ pressures typically range from about 30 to about 1,000 pounds per square inch (about 2 bar to about 70 bar); treatment temperatures typically range from about 32° F. (0° C.) to about 200° F. (93° C.); and treatment duration typically ranges from about 1 minute to about 6 weeks. Preferably, during the treatment process $CO_2$ pressures range from about 30 to about 100 pounds per square inch (about 2 bar to about 7 bar); treatment temperatures range from about 40° F. (14° C.) to about 150° F. (65° C.); and treatment duration is typically range from about 1 hour to about 3 weeks. Such a $CO_2$ treatment can be performed while the coating is being cured and/or after it has been cured.

In another embodiment, after the gas barrier coating is coated over the gas-permeable polymeric packaging material which is in the form of a sealable container, the container is at least partially filled with a carbonated beverage and sealed. Since $CO_2$ can pass through the packaging material layer, the carbonated beverage can be used as the $CO_2$ treating medium.

The gas barrier coating used when practicing this invention includes the reaction product of a polyamine (A) and a polyepoxide (B). Polyamine (A) can be an initial polyamine, an ungelled polyamine adduct, or a mixture thereof. As used herein, the term "ungelled polyamine adduct" refers to an amine-functional polymeric resin which is soluble and/or dispersible in a liquid medium.

The initial polyamine used as, or in the making of, polyamine (A) is typically characterized as having a substantial aromatic content. Specifically, at least 50 percent of the carbon atoms in the initial polyamine are in aromatic rings (e.g., phenylene groups and/or naphthylene groups). Preferably the number of the initial polyamine carbon atoms in aromatic rings is at least 60 percent, more preferably at least 70 percent, and even more preferably at least 80 percent. This initial polyamine can be represented by the structure:

where:

k is 1.5 or greater,

Φ is an aromatic-containing organic compound, and $R^1$ is an alkyl group having between 1 and 4 carbon atoms.

Preferably, k is 1.7 or greater, more preferably 1.9 or greater, and even more preferably, 2.0 or greater. Preferably, $R^1$ is not larger than $C_3$, more preferably not larger than $C_2$, and even more preferably not larger than $C_1$. Typically, Φ comprises an aryl group, preferably a benzyl and/or a naphthyl group.

The gas barrier coating compositions of the present invention can be produced without having to form an ungelled polyamine adduct. In instances where a polyamine adduct is not formed, all of the epoxide required for curing the gas barrier coating composition (i.e., polyepoxide (B)) is blended with the initial polyamine (i.e., polyamine (A)).

When an initial polyamine is pre-reacted to form an adduct, sufficient active amine hydrogen groups must be left unreacted so as to provide reaction sites for reacting during the final curing step. Typically, about 10 to about 80 percent of the active amine hydrogens of the polyamine are reacted with epoxy groups. Pre-reacting fewer of the active amine hydrogens reduces the effectiveness of the pre-reaction step and provides little of the linearity in the polymer product that is one of the advantages of forming the adduct.

In accordance with one embodiment, a polyamine adduct is formed by reacting the initial polyamine with epichlorohydrin. By carrying out the reaction at polyamine to epichlorohydrin molar ratios greater than about 1:1 in the presence of an alkali, a primary reaction product is polyamine groups joined by 2-hydroxypropylene linkages. The reaction of m-xylylenediamine ("MXDA"), a preferred polyamine, with epichlorohydrin is described in U.S. Pat. No. 4,605,765, and such products are commercially available as GASKAMINE 328® and GASKAMINE® 328S from Mitsubishi Gas Chemical Company.

In accordance with another embodiment, a polyamine adduct is formed by reacting the initial polyamine with polyepoxides in which a plurality of glycidyl groups are linked to an aromatic member. As used herein, the term "linked" refers to the presence of an intermediate linking group. Such polyepoxides can be represented by Formula (I):

where:

$R^2$ is phenylene or naphthylene;

X is the intermediate linking group and is N, $NR^3$, $CH_2N$, $CH_2NR^3$, O, and/or C(O)—O, where $R^3$ is an alkyl group containing 1 to 4 carbon atoms, a cyanoethyl group or cyanopropyl group;

n is 1 or 2; and m is 2 to 4. Examples of such polyepoxides include: N,N,N',N'-tetrakis (oxiranylmethyl)-1,3-benzene dimethanamine (e.g., that which is commercially available as TETRAD X epoxy resin from Mitsubishi Gas Chemical Co.), resorcinol diglycidyl ether (e.g., that which is commercially available as HELOXY® 69 epoxy resin from Shell Chemical Co.), diglycidyl esters of phthalic acid (e.g., that which is commercially available as EPI-REZ® A-100 epoxy resin from Shell Chemical Co.), and triglycidyl para-aminophenol (e.g., that which is commercially available as Epoxy Resin 0500 from Ciba-Geigy Corporation).

Optionally, if a polyamine adduct is formed, it may also include up to about 20 weight percent a novolac epoxy resin or a bisphenol F epoxy resin. This percentage is based upon the total resin solids of the adduct.

Notably excluded from the types of epoxides that can be reacted with the initial polyamine to form a polyamine adduct are bisphenol A type epoxy resins. Alternatives for such bisphenol A type epoxides which can be reacted with the initial polyamine in accordance with the present invention include novolacs with higher glycidyl functionality (e.g., those commercially available from Dow Chemical Co. as DEN-438 and/or DEN-439).

The reaction of the epoxide and the initial polyamine to produce the ungelled adduct is carried out at temperatures and concentrations of reactants sufficient to produce the desired ungelled product. These temperatures and concentrations will vary depending upon the selection of starting materials. Typically, however, reaction temperatures will range from about 40° C. to about 140° C., with lower temperatures (e.g., from about 40° C. to about 110° C.) being preferred for those systems that are more susceptible to gellation. Similarly, concentrations of reactants will typically range from about 5 to about 100 percent by weight of reactant in an appropriate solvent depending upon the particular molar ratio and type of reactants. Lower concentrations of reactants are generally preferred for those systems that are more susceptible to gellation.

Specific reaction conditions can readily be chosen by one skilled in the art guided by the disclosure and the examples herein. Moreover, preparation of an ungelled polyamine adduct is also described in commonly-owned U.S. Pat. No. 5,006,381, columns 2 through 7. The description in U.S. Pat. No. 5,006,381, of the preparation of such polyamine adducts, is incorporated herein by reference.

In most instances, when compared to the non adduct producing approach, forming the polyamine adduct typically has the advantage of increasing molecular weight while maintaining linearity of the resin, thereby avoiding gellation. This can be achieved, for example, by using an initial polyamine having no more than two primary amino groups.

Typically, the initial polyamines employed when practicing this invention react relatively slowly with polyepoxide (B). On the other hand, the aforementioned polyamine adduct reacts relatively quickly with polyepoxide (B). Accordingly, another advantage of forming the polyamine adduct is that the reaction period necessary to form the resulting gas barrier coating can be significantly reduced.

Polyepoxide (B) used when practicing this invention may be any epoxide known to those of skill in the art which can react with polyamine (A) to form gas barrier coating compositions. Preferably, polyepoxide (B) includes those polyepoxides in which a plurality of glycidyl groups are linked to an aromatic member. General examples of such polyepoxides include those represented by Formula (I) described earlier. Specific and preferred examples of such a group of polyepoxides also include those described earlier which can be reacted with the initial polyamine to form the ungelled polyamine adduct.

When polyepoxides are employed in the formation of a polyamine adduct, they may be the same or different as those used as polyepoxide (B). Typically, if a polyamine adduct is used in the formation of the gas barrier coatings of this invention, the epoxides used in forming the polyamine adduct and those used as polyepoxide (B) have epoxy functionality of at least about 1.4, and preferably at least about 2.0 The presence of small amounts of monoepoxides may not, however, be objectionable.

Polyepoxide (B) may include polyepoxides that are saturated or unsaturated, aliphatic, cycloaliphatic, aromatic, or heterocyclic, and may be substituted with non-interfering substituents such as hydroxyl groups or the like. Generally, such polyepoxides may include polyglycidyl ethers of aromatic polyols, which may be formed by etherification of aromatic polyols with epichlorohydrin or dichlorohydrin in the presence of an alkali. Specific examples of such include: bis(2-hydroxynaphthyl)methane, 4,4'-dihydroxylbenzophenone, 1,5-dihydroxy-naphthalene and the like. Also included in the category of a suitable polyepoxide (B) are polyglycidyl ethers of polyhydric aliphatic alcohols including cyclic and polycyclic alcohols.

The epoxy group equivalent weight of polyepoxide (B) is preferably minimized so as to avoid unnecessarily introducing molecular groups into the cured polymeric network that are not the preferred groups of this invention. Generally, polyepoxide (B) has a molecular weight above about 80. Preferably, the molecular weight of polyepoxide (B) is in the range from about 100 to about 1,000, and more preferably from about 200 to about 800. Moreover, polyepoxide (B) generally has an epoxy equivalent weight above about 40. Preferably, the equivalent weight of polyepoxide (B) is in the range from about 60 to about 400, and more preferably from about 80 to about 300.

The diglycidyl ethers of an aromatic polyol such as bisphenol A or an aliphatic alcohol such as 1,4-butanediol are not preferred when practicing the present invention. However, they may be tolerated when used to cure preferred embodiments of the polyamine adduct. Diglycidyl ethers of bisphenol F are preferred over bisphenol A based epoxides for the sake of low oxygen permeability. It is theorized that the presence of methyl groups in bisphenol A has a detrimental effect on gas barrier properties. Thus, isopropylidene groups are preferably avoided. Other unsubstituted alkyl groups are believed to have a similar effect, and constituents containing such groups are preferably avoided in the present invention.

The polymers that comprise the chief film-forming resin of the gas barrier coating of the present invention are cured in situ when polyamine (A) and polyepoxide (B) are mixed together. Each amine hydrogen of polyamine (A) is theoretically able to react with one epoxy group and is considered as one amine equivalent. Thus, a primary amine nitrogen is considered as difunctional in the reaction with epoxides to form the gas barrier coating.

For the purposes of this invention, these two components are typically reacted in a ratio of the equivalents of active amine hydrogens in polyamine (A) to equivalent of epoxy group in polyepoxide (B) of at least about 1:1.5. In order to produce a gas barrier coating which is strong, flexible, moisture resistant and solvent resistant, the ratio of the equivalents of active amine hydrogens in polyamine (A) to equivalent of epoxy group in polyepoxide (B) is preferably in the range from about 1:1.5 to about 1:3.0, more preferably from about 1:1.75 to about 1:2.75, and even more preferably from about 1:2.0 to about 1:2.5.

Preferably, the cured reaction product of polyamine (A) and polyepoxide (B) contains a substantial number of unreacted amine hydrogens. However, although maximizing the amount of polyamine reactant is generally desirable for the sake of maximizing gas barrier properties, insufficient numbers of epoxy groups may not provide enough crosslinking to yield a film which is strong, moisture resistant and solvent resistant. On the other hand, the use of more epoxy than the preferred amounts may provide excessive crosslinking to yield a film that is very brittle.

As the amount of amine nitrogen in the gas barrier coating increases, the coating's OPC value typically decreases. When practicing this invention, the amine nitrogen content in the cured gas barrier coating is typically at least about 6.0 weight percent. Preferably, the cured gas barrier coatings of this invention have an amine nitrogen content of at least about 6.5 weight percent, and more preferably of at least about 7.0 weight percent. Typically, for economical reasons, the maximum amount of amine nitrogen content in the cured gas barrier coating of this invention is generally less than about 20 weight percent, more typically less than about 17 weight percent, and even more preferably less than about 15 weight percent. These weight percentages are based upon total resin solids weight of the gas barrier coating.

Cured films of the gas barrier coating compositions prepared in accordance with the present invention have a molecular network that consists predominantly of two molecular groups:

(1) aminoalkyl substituted aromatic groups of the type

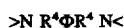

where, $R^4$ is an alkyl group containing not more than 4 carbons, preferably not more than 3, more preferably not more than 2, and even more preferably not more than 1 carbon atom), and (2) —$CH_2CH(OH)CH_2$— (2-hydroxypropylene groups) groups.

Typically, the amount of the aminoalkyl substituted aromatic groups present in the cured gas barrier coating is at least about 50 weight percent, more preferably at least about 55 weight percent, and even more preferably at least about 60 weight percent. The amount of the 2-hydroxy-propylene groups present in the cured gas barrier coating is typically at least about 20 weight percent, more preferably at least about 30 weight percent, and even more preferably at least about 40 weight percent. These weight percentages are based upon the total weight of resin solids of the gas barrier coating. Examples of these embodiments include m-xylylenediamine adducted with epichlorohydrin or with N,N,N',N' tetrakis (oxiranylmethyl)-1,3-benzene dimethanamine (TETRAD X epoxy resin) and cured with TETRAD X epoxy resin.

Excellent gas barrier properties can be attained when the cured film network of the gas barrier coating contains at least about 70 weight percent of aminoalkyl substituted aromatic groups and/or 2-hydroxypropane groups. For the purposes of this invention, the gas barrier coating preferably contains at least about 80 weight percentages these two molecular groups, more preferably a more preferably at least about 95 weight percent. These weight percentages are based upon the total weight of resin solids of the gas barrier coating.

As stated above, in one preferred embodiment, at least 50 percent of the carbon atoms in the initial polyamine used as, or in the making of, polyamine (A) are in an aromatic ring(s). In a particularly useful embodiment, $R^4$ in the $>N R^4 \Phi R^4 N<$ group contains a single carbon atom. Accordingly, when $\Phi$ is a benzyl group, at least seventy percent of the carbon atoms are in aromatic rings.

It should be understood, however, that the requisite amount of gas barrier properties necessary for the purposes of this invention may still be attained without the optimum levels of the aminoalkyl substituted aromatic groups and/or the 2-hydroxypropane groups molecular groups described above. For example, in addition to the aforementioned preferred groups, some of the aminomethyl substitutions can be replaced with oxy substitutions, (i.e., —O—$\Phi$—O— groups). These may be introduced into the network by adducting the initial polyamine with the polyglycidyl ethers of polyphenols (e.g., diglycidyl ether of resorcinol) or by curing one of the preferred adducts with such a polyglycidyl ether of a polyphenol. Additionally, some of the aminomethyl substitutions can also be replaced with mixed substitutions such as —O—$\Phi$—N< groups. These particular groups could be the residue of adducting or curing the initial polyamine with triglycidyl para-aminophenol.

Although not exhibiting performance properties which may be characterized as preferred for the purposes of this invention, the cured polymer network of the gas barrier coating can also include: —O—$\Phi$—CH$_2$—$\Phi$—O— groups, which are the residues of novolac epoxy resins or bisphenol F epoxy resins; and —O—C(O)—$\Phi$—C(O)—O groups, which are derived from diglycidyl esters of aromatic acids.

While maximizing the content of the aminoalkyl substituted aromatic groups and/or the 2-hydroxypropane groups present in the gas barrier coating is generally desirable, it has also been found to be additionally advantageous that the content of certain molecular groups be minimized in, or even essentially absent from, the gas barrier coating's cured polymer network. For example, the groups that are preferably avoided include unsubstituted alkyl chains, particularly alkylene polyamine groups, as well as isopropylidene groups (i.e., as in bisphenol A).

It should be apparent from the description herein that the desired molecular groups may be introduced into the cured polymeric network of the gas barrier coating by the initial polyamine, the polyamine adduct or the epoxide curing component (i.e., polyepoxide (B)). It should also be apparent that the various substitutions on the aromatic members described above may be provided in combination with each other on the same molecule in the reactants.

The gas barrier coatings of the present invention are thermoset polymers. This is desired feature for the packaging industry since containers often rub together during processing and shipping. Accordingly, since the gas barrier coatings of this invention are thermosetting polymers, any such rubbing together of adjacent containers will be less likely to cause localized softening of the barrier coatings when compared to thermoplastic gas barrier coatings.

When practicing this invention, the gas barrier coating can be applied over the gas-permeable packaging material as either a solvent-based or an aqueous-based thermosetting coating composition. If solvents are used, they should be chosen so as to be compatible with the gas-permeable packaging material being coated, and also provide desirable flow properties to the liquid composition during application. Suitable solvents which can be used when practicing this invention include: oxygenated solvents, such as glycol ethers (e.g., 2-methoxyethanol, 2-ethoxyethanol, 2-propoxyethanol, 2-butoxyethanol, 1-methoxy-2-propanol and the like); or alcohols such as methanol, ethanol, propanol and the like. Glycol ethers, such as 2-butoxyethanol and 1-methoxy-2-propanol, are more preferred with 1-methoxy-2-propanol being most preferred. The use of 1-methoxy-2-propanol is preferred for its rapid evaporation rate, which minimizes solvent retention in the cured film. In order to obtain desired flow characteristics in some of the embodiments using a pre-reacted adduct, use of 2-butoxyethanol may be preferred. Moreover, in embodiments not requiring slow evaporating solvents for the sake of flow properties, the solvents listed here may be diluted with less costly solvents such as toluene or xylene. The solvent may also be a halogenated hydrocarbon. For example, a chlorinated hydrocarbon, such as methylene chloride, 1,1,1-trichloroethane and the like (usually considered fast evaporating solvents), may be especially useful in obtaining cured barrier films. Mixtures of such solvents may also be employed. Non-halogenated solvents are preferred where the resultant barrier coating is desired to be halide-free.

The resin may also be in an aqueous medium (i.e., the ungelled polyamine adduct may be an aqueous solution or dispersion). For example, when polyepoxide (B) is water-soluble (e.g., the polyglycidyl ether of an aliphatic diol), the ungelled polyamine adduct can be utilized as an aqueous solution. Otherwise, with water-insoluble polyepoxides, the ungelled polyamine adduct can have sufficient amine groups neutralized with an organic acid (e.g., formic acid, lactic acid or acetic acid), or with an inorganic acid (e.g., hydrochloric acid or phosphoric acid), to allow solubilization of the ungelled polyamine adduct in an aqueous medium. For such aqueous-based systems, an organic acid is typically preferred.

Generally, for embodiments employing the polyamine adduct approach, the solution of the polyamine adduct ready for application will have a weight percent of resin solids in the range of from about 15 weight percent to about 50 weight percent, and preferably from about 25 weight percent to about 40 weight percent. Higher weight percent solids may present application difficulties, particularly with spray application, while lower weight percentages will typically require removal of greater amounts of solvent during the curing stage. For the embodiments which do not employ the polyamine adduct approach, solids contents above 50 weight percent can be applied successfully.

In a preferred embodiment, the gas barrier coatings of this invention further include a filler (C). It has been observed that the presence of a sufficient amount of a filler having the appropriate particle size distribution even further improves the OPC values of the gas barrier coatings of this invention while maintaining a 20° gloss of at least 60% reflected light. In accordance with the embodiment of this invention which employs a filler to improve the coating's OPC value while maintaining a smooth and glossy appearance, filler (C) is typically characterized as a platelet-type filler which has the following particle size distribution: (a) a number mean particle diameter ranging from about 5.5 to about 15 microns, and (b) a volume mean particle diameter ranging from about 8 to about 25 microns. Preferably, the platelet-type filler included in filler (C) has the following particle size distribution: (a) a number mean particle diameter ranging from about 7.5 to about 14 microns, and (b) a volume mean particle diameter ranging from about 10 to about 23 microns; and more preferably the following particle size distribution: (a) a number mean particle diameter ranging from about 9.5 to about 13 microns, and (b) a volume mean particle diameter ranging from about 14 to about 20 microns. In addition to the above, in preferred embodiments of this invention, the platelet-type filler included in filler (C) further has the following particle size distribution: (a) at least about 55 percent by number of its particles having a diameter greater than 7 microns, and (b) less than about 15 percent by number of its particles having a diameter greater than 30 microns; preferably: (a) at least about 75 percent by number of its particles having a diameter greater than 7 microns, and (b) less than about 10 percent by number of its particles having a diameter greater than 30 microns; and more preferably: (a) at least about 95 percent by number of its particles having a diameter greater than 7 microns, and (b) less than about 5 percent by number of its particles having a diameter greater than 30 microns.

As used herein, the term "number mean particle diameter" refers to the sum of the equivalent circle diameter of all the particles in the sample that were analyzed ($\Sigma d$) divided by the total number of the particles that were analyzed.

As used herein, the term "equivalent circle diameter" refers to the diameter of a circle having a projected area equal to the projected area of the particle in the sample being analyzed.

As used herein, the term "volume mean particle diameter" refers to the cube root of the sum of the equivalent spherical diameter of all the particles in the sample that were analyzed $((\Sigma d^3)^{1/3})$ divided by the total number of the particles that were analyzed.

As used herein, the term "equivalent spherical diameter" refers to the diameter of a sphere having a volume equal to the volume of the particle being analyzed.

All particle size measurements pertaining to the filler used when practicing the embodiment of this invention which employs filler (C) are as determined by a HORIBA LA-900 laser scattering particle size distribution analyzer from Horiba Instruments, Inc. in Irving, Calif. The HORIBA LA-900 works off the same principle as many conventional laser scattering particle size distribution analyzers.

For example, light traveling in a homogeneous medium travels in straight lines. However, when light travels through a medium containing particles of a material, the particles cause the light to scatter. For a single particle, the amount of scattering in a particular direction depends upon the size, shape, and composition of the particle and the wavelength of the incident light. For a collection of particles, light scattered from all of the particles contributes to the total intensity of light scattered in a particular direction relative to the incident light. By measuring the amount and/or intensity of light scattered throughout a number of angles relative to the incident light, it is possible to infer properties of the particles that induce the scattering. In particular, for particles of small size and similar composition, the pattern of scattered light is indicative of the sizes of the scattering particles.

Many conventional analyzers have used the aforementioned technique of analyzing the scattered light intensity to determine the spectrum of particle sizes for a mixture of small particles of varying sizes. Particle size analyzers using this technique typically sample the angular distribution of the intensity of the light scattered from the mixture, process the data, and produce numerical values and possibly a graph or a histogram as output. The analyzer output represents the number or volume fraction of scattering particles in the mixture as a function of the size of the particles and is usually called a particle size distribution.

For classical light scattering analysis, the problem of relating the angular distribution of scattered light to the size of the scattering particle has been solved mathematically for the case of a spherical particle illuminated by a beam of unpolarized light. The mathematical solution is given by a theory proposed by Gustav Mie. The Mie theory is set forth in Chapter 4 of the book, *Absorption and Scattering of Light by Small Particles*, by Craig F. Bohren and Donald R. Huffman (John Wiley & Sons, 1983). Some particle size analyzers employ the Mie theory to determine particle size distributions from the observed pattern of scattered light.

Although such analyzers are not limited to the analysis of only samples containing particles of spherical shape, the particle sizes are reported as radii of spheres that are equivalent to the actual particles in terms of light scattering. For most applications, the equivalent-sphere specification of a particle size distribution is sufficient to characterize the actual particle size distribution. Mathematical models have also been derived for particular particle shapes other than spherical, but they have been found to have limited value since, for scattering, only the average behavior of a large number of particles is of interest.

Since scattering is also a function of the wavelength of the incident light, some analyzers use incident light of a single wavelength. For this purpose, a laser has been the typical light source. Lasers have been used which produce light in the visible and near- visible wavelength range.

In many typical particle size distribution analyzers, a source of unpolarized light is projected in a beam to impinge upon a sample. The sample contains the particles whose sizes are under investigation. The particles are dispersed in the region of the sample that is illuminated by the incident light beam. The particles scatter light in patterns that are dependent on the ratio of the size of the particle to the wavelength of the light, and on the refractive index of the particle material. The refractive index, a complex function of wavelength, is a measure of how much the light is refracted, reflected, and absorbed by the material. For a beam of unpolarized light incident on a random mixture of small particles, the scattering pattern is symmetric about the axis of the incident beam. The scattering is the result of the refraction, reflection, and absorption by the particles, as well as diffraction at each particle surface where a light ray in the incident beam is tangent to the particle surface.

Light that scatters at a particular angle with respect to the incident beam may be rotated about the beam axis without changing the scattering angle. A large number of rays scattering from a single particle at a given scattering angle will fill all rotational orientations and thus form a cone of light, with the apex at the scattering particle and with the generating angle (one-half the apex angle) of the cone equal to the scattering angle. The pattern of light rays scattering at all angles from a single particle may thus be thought of as made up of a continuous series of open cones of light, with the generating angle for a given cone corresponding to the scattering angle for the light comprising the surface of that cone. The axes of all of the cones are collinear with the line defined by the incident beam, and the apexes of the cones are located at the scattering particle. At a distance from the scattering particle, a plane perpendicular to the incident beam will intersect a given cone in a circle. Planes not perpendicular to the incident beam will intersect a given cone in a curved line comprising a conic section (i.e., an ellipse, a parabola, or a hyperbola), depending upon the orientation of the plane. Regardless of form, the curved line of intersection represents a single scattering angle.

In particle size analyzers, it is not necessary to measure the scattering angle with infinite precision. Nevertheless, better angular resolution in the analyzer provides better particle size resolution. In order to address angular precision effects directly, the set of all scattering angles falling between a precise lower angular limit and a precise upper angular limit will be referred to as an "angle class" of some intermediate angle. Light scattered within an angle class scatters into the region between two cones of slightly different size. The smaller (inner) of the two cones is generated by the lower angular limit of the angle class and the larger (outer) cone is generated by the upper angular limit. The apexes of both cones are located at the scattering particle.

The inner and outer cones of an angle class define a circular annular region on a plane perpendicular to the incident beam and a more complex shaped region (corresponding to a conic section) on a plane not perpendicular to the incident beam. Scattered light rays intersecting the interior of such a region are rays which have scattered through an angle between the two generating angles of the cones. Thus any light ray intersecting such a region belongs to the angle class defined by that region. Some conventional analyzers employ ring-shaped light detectors to measure the amount of light that scatters in an angle class determined by the radius and width of the ring and its distance from the scattering region. To correlate correctly the detected light with a scattering angle, these ring-shaped detectors are typically mounted and aligned precisely perpendicular to the incident beam.

Since the interaction region of the incident beam with the particles generally has a finite extent, multiple particles at different locations in the incident beam will each contribute multiple overlapping cones of scattered light, with the apexes of the cones offset by the distance between the particles. Particles of the same size will have overlapping scattered-light cones of similar intensity variations, whereas particles of different sizes will have overlapping scattered-light cones of different intensity variations.

When the light beam illuminates a sample volume of finite extent, a converging lens may be used to direct parallel rays of light, each by definition scattered through the same scattering angle (by different particles), to a single point on a light detector in the focal plane of the lens. A lens that functions in this manner performs a Fourier transform, so that all light arriving at a given point on the detector is known to have been scattered by the sample through a particular scattering angle, regardless of the location of the scattering particle in the sample volume.

The effect of the converging lens is to transform the spatial distribution of the scattered light it receives to that of an equivalent virtual system in which the light distribution in the focal plane of the lens is the same as if all the scattering particles were located at a point coincident with the optic center of the lens. The light detectors are placed in the focal plane of the lens. The line from the optic center of the lens to the focal point of the lens is usually called the optic axis.

If a scattered ray passes through different refracting media, such as air and a sample suspension fluid, before detection, then an appropriate correction is typically applied to the ray's apparent angle of scatter to determine its true angle of scatter. Use of a lens and recognition of the virtual scattering system simplifies the correction.

The intensity of light scattered as a function of scattering angle, when experimentally determined as above for a sample composed of many particles of a range of different sizes, consists of the summation of the scattered light from all the particles. If it is assumed that each size particle in the sample scatters light according to a given mathematical theory and in proportion the relative number of such size particles present, then it is mathematically possible to determine from the experimental data the relative numbers of each size particle constituting the sample (i.e., to determine the size distribution of the sample. The well-known mathematical process by which the size distribution may extracted from the composite data is called an inversion process, or sometimes a deconvolution process.

In the usual convention, a scattering angle of zero degrees coincides with unscattered light, and a scattering angle of 180 degrees represents light reflecting directly back into the incident beam. Scattering angles between 90 and 180 degrees are termed back scattering.

Similar to these conventional particle size distribution analyzers, the HORIBA LA-900 works by irradiating particles dispersed in a solution with a red light beam and a blue light beam which is obtained by filtering a tungsten lamp in parallel with an He-Ne laser. The particles cause the light to scatter at various angles. A condenser lens is used with an array detector at the focal point of the lens. There are also detectors positioned in the front, side and rear of the sample. From the angular measurement of the scattered light by all the detectors, the particle size distribution of the sample is calculated. These computations are made by the particle size distribution analyzer by using the Mie scattering light theory. Using the technique set out above, the HORIBA LA-900 laser scattering particle size distribution analyzer can provide an accurate, reproducible assessment of particle sizes in the range from 0.04 microns to 1,000 microns.

To measure particles having a diameter less than 0.1 microns, the HORIBA LA-900 uses three separate detectors—one for the front, side and rear scattering. As the light source for detecting scattering on the side and rear, the HORIBA LA-900 uses a tungsten lamp. In the HORIBA LA-900, the small angle forward scattered light is conventionally given by an He-Ne laser and detected by the ring detector and the large angle and rear scattered light is given by the tungsten lamp and detected by a photodiode. For a complete description of how the HORIBA LA-900 works, see U.S. Pat. No. 5,4278,443.

It has been observed that the incorporation of a sufficient amount of a platelet-type filler having a particle size distribution within the aforementioned particle size distribution parameters into a barrier coating comprising polyamine (A) and polyepoxide (B) as described herein results in a gas barrier coating composition which, when cured and prior to any $CO_2$ treatment, has an OPC value of not more than 0.05 and a 20° gloss of at least 60% reflected light. However, it has also been observed that, when a platelet-type filler is used which has a particle size distribution outside of the aforementioned parameters, or if an insufficient amount of a platelet-type filler is used which has a particle size distribution within the aforementioned parameters, the resulting gas barrier coating, prior to any $CO_2$ treatment, may not have an OPC value of not more than 0.05 and/or a 20° gloss of at least 60% reflected light.

When filler (C) has the following particle size distribution: (a) a number mean particle diameter ranging from about 9.5 to about 15 microns, and (b) a volume mean particle diameter ranging from about 14 to about 25 microns., in order for the resulting gas barrier coating to have an OPC value of not more than 0.05 and a 20°·gloss of at least 60% reflected light prior to any $CO_2$ treatment, filler (C) is preferably present in an amount ranging from about 5 to about 50 weight percent, more preferably in an amount ranging from about 6 to about 45 weight percent, and even more preferably from about 7 to about 40 weight percent. These weight percentages are based upon the total solids weight of the gas barrier coating composition.

However, when the number mean particle diameter of filler (C) ranges from about 5.5 to less than 9.5 microns, and/or when the volume mean particle diameter ranges from about 8 to less than 14 microns, in order for the resulting coating composition to have an OPC value of not more than 0.05 prior to any $CO_2$ treatment, filler (C) is preferably present in an amount ranging from about 12 to about 50 weight percent, more preferably in an amount ranging from about 15 to about 45 weight percent, and even more preferably from about 18 to about 40 weight percent. These weight percentages are based upon the total solids weight of the gas barrier coating composition.

Any suitable platelet-type filler which has the aforementioned particle size distribution and which is compatible with the barrier coating composition described above can be used when practicing this embodiment of the invention. Examples of such suitable fillers include: mica, vermiculite, clay, talc, micaeous iron oxide, silica, flaked metals, flaked graphite, flaked glass, flaked phthalocyanine, and the like. Of the fillers which have the aforementioned particle size distribution parameters, the preferred, for the purposes of this invention, is mica due to its commercial availability.

Micas which can be used when practicing this invention include natural micas and synthetic micas. Examples of natural micas include: muscovite $(K_2Al_4(Al_2Si_6O_{20})(OH)_4)$, phlogopite $(K_2(Mg,Fe^{2+})_6(Al_2Si_6O_{20})(OH,F)_4)$, and biotite $(K_2(Fe^2,Mg)_6(Al_2Si_6O_{20})(OH)_4)$. Examples of synthetic micas include: fluorophlogopite $(K_2Mg_6Al_2Si_6O_{20}F_4)$ and barium disilicic $(Ba_2Mg_6Al_2Si_6O_{20}F_4)$. Of the micas which aforementioned particle size distribution parameters, the preferred, for the purposes of this invention, is muscovite mica due to its commercial availability.

Gas barrier coatings of this invention can further include other additives known to those skilled in the art. Some of the more common additives which can be present in the gas barrier coating include: pigments, silicones, surfactants, and/or catalysts for coating compositions which involve an epoxy-amine reaction. Each of these specific optional components will be discussed below.

With regard to the use of pigments, in addition to imparting color and/or tint to the gas barrier coating, their use can also further reduce the amount of gas that permeates therethrough. If employed, the weight ratio of pigment to binder is typically not more than about 1:1, preferably not more than about 0.3:1, and more preferably not more than about 0.1: 1. The binder weight used in these ratios is the total solids weight of the polyamine-polyepoxide resin in the gas barrier coating.

With regard to the use of silicones, they may be included in the gas barrier coating to assist in wetting the gas-permeable packaging material over which the barrier coating will be applied. Generally, silicones which can be used for this purpose include various organosiloxanes such as polydimethylsiloxane, polymethylphenylsiloxane and the like. Specific examples of such include: SF-1023 silicone (a polymethylphenylsiloxane available from General Electric Co.), AF-70 silicone (a polydimethylsiloxane available from General Electric Co.), and DF-100 S silicone (a polydimethylsiloxane available from Mazer Chemicals, a division of PPG Industries, Inc.). If employed, such silicones are typically added to the gas barrier coating in amounts ranging from about 0.01 to about 1.0 percent by weight based on total resin solids in the gas barrier coating.

With regard to the use of surfactants, they are typically included in the aqueous-based versions of the gas barrier coating. Examples of surfactants that can be used for this purpose include any suitable nonionic or anionic surfactant. If employed, such surfactants are typically present in an amount ranging from about 0.01 to about 1.0 percent by weight based on the total weight of the gas barrier coating.

With regard to the use of catalysts, they may be included in the gas barrier coating to aid in the reaction between polyamine (A) and polyepoxide (B). Generally, any suitable catalyst that is used for epoxy-amine reactants can be employed when practicing this invention. Examples of such suitable catalysts include: dihydroxy aromatics (e.g., resorcinol), triphenyl phosphite, calcium nitrate and the like.

Typically, when applying the gas barrier coating to the gas-permeable packaging material, the components of a gas barrier coating (i.e., polyamine (A) and polyepoxide (B), and filler (C) when present) are first thoroughly mixed together. The mixture can then be immediately applied to the gas-permeable packaging material, or held for a period of time typically ranging from about 1 minutes to about 60 minutes prior to application to improve cure and/or clarity. This holding time can be reduced and/or eliminated when the initial polyamine is in the form of a polyamine adduct or when the solvent employed is 2-butoxyethanol.

When practicing this invention, the gas barrier coating can be applied over the gas-permeable packaging material by any conventional means known to those skilled in the an (e.g., spraying, rolling, dipping, brushing and the like). However, for the purposes of this invention, spray and/or dipping applications are preferred.

After application of the gas barrier coating, it may be cured at temperatures as low as ambient temperature by allowing for a gradual cure over several hours to several days. However, such low temperature curing is generally slower than desired for commercial production lines. It is also not an efficient means of removing solvent from the cured barrier coating. Therefore, in one embodiment, the gas barrier coating is cured by being heated at elevated temperatures as high as possible without distorting the gas-permeable packaging material overwhich it is applied.

For a relatively "slow" solvent (i.e., a solvent having a relatively low evaporation rate), curing temperatures typically range from about 55° C. to about 110° C., and preferably from about 70° C. to about 95° C. At such curing temperatures, curing times will typically range from about 1 minute to about 60 minutes.

For a relatively "fast" solvent (i.e., a solvent having relatively high evaporation rate), curing temperatures typically range from about 35° C. to about 70° C., and preferably from about 45° C. to about 65° C. At such curing temperatures, curing times will typically range from about 0.5 minute to about 30 minutes.

The cured gas barrier coatings of the present invention can have any suitable dry film thickness. Although thicker coatings typically provide greater gas protection, the packaging industry typically prefers thinner coating for appearance and/or economic reasons. As such, the cured gas barrier coatings of this invention generally have a dry film thickness of not more than about 1.0 mil (25.4 microns). If even thinner films are desired, the cured gas barrier coating of this invention can provide the aforementioned gas barrier properties at a dry film thickness of not more than about 0.5 mil (12.7 microns), and even of not more than about 0.3 mil (7.6 microns).

The gas barrier coating may be applied over the gas-permeable packaging material as a single layer or as multiple layers with multiple heating stages to remove solvent from each subsequent layer. Both are referred to herein as "multilayer" packaging materials.

In one embodiment of a multilayer packaging material encompassed by this invention, a laminate including a layer of the gas barrier coating may be formed. Here, the gas barrier coating is applied onto a first layer of a gas-permeable packaging material. Thereafter, a second layer of a similar or dissimilar packaging material is applied over the layer of the gas barrier coating to form a laminate.

In another embodiment of a multilayer packaging material encompassed by this invention, a sheet or film stock of a gas-permeable material, which can be subsequently formed into containers by conventional processing techniques, is coated with a gas barrier coating described herein. The resulting multilayer packaging material encompassed by this invention may then be used as such or formed into articles such as: wrappers, bags, containers and the like. In this embodiment, the $CO_2$ treatment is typically performed any time after the gas barrier coating has been applied over the film or sheet stock.

In yet another embodiment of a multilayer packaging material encompassed by this invention, pre-formed, sealable containers (e.g., sealable carbonated alcoholic beverage containers), made with at least one layer of a gas-permeable packaging material, are coated with the gas barrier coating described herein. In this embodiment, the $CO_2$ treatment is typically performed any time after the gas barrier coating has been applied over the pre-formed, sealable container.

The multilayer packaging materials of this invention do not require the use of adhesives, tie layers or the like between the gas-permeable polymeric materials and the gas barrier materials. Notwithstanding these excellent adhesion properties, the gas barrier coatings of this invention can easily be separated from the gas permeable substrate over which they are applies by plastic recyclers using conventional recycling techniques. For example, the gas barrier coatings of this invention can easily be removed by washing the multilayer packaging material with hot acetic acid. This particular washing technique is preferred since it removes the gas barrier material in the form of a sheet and does not adversely affect the underlying gas-permeable material.

The multilayer packaging materials of the present invention are ideally suited for packaging of food, beverages, chemicals, medicines, medical supplies, and the like. However, their very low OPC values makes them especially suited for packaging malt beverages.

As stated above, it is known that malt beverages are not stable in light with wavelengths of electromagnetic radiation ranging from 300 nm to about 500 nm (i.e., "product damaging light"). As also stated above, it is also known that brown or dark amber-tinted glass substantially blocks most of this product damaging light. Accordingly, if the multilayer packaging materials of the present invention are used for packaging malt beverages, the gas barrier coating and/or the gas-permeable substrate should be tinted so as to block at least about 90% of the product damaging light, preferably at least about 95% of the product damaging light, and more preferably at least about 97% of the product damaging light.

If the gas-permeable material is tinted so as to substantially block product damaging light, this can be done by any suitable means known to those in the art. However, from a recycling standpoint, it is undesirable to recycle tinted plastics since this often requires manual sorting. It would greatly reduce recycling time and costs if all of the plastic being recycled was clear and un-tinted. Accordingly, since the gas barrier coating of this invention are easily removable by a recycler, the use of a tinted gas barrier coating over an un-tinted gas-permeable polymeric material is preferred.

When tinting the gas barrier coating so as to substantially block the aforementioned product damaging light, the weight ratio of pigment to binder is typically not more than about 1:1, preferably not more than about 0.3:1, and more preferably not more than about 0.1:1. The binder weight used in these ratios is the total solids weight of the polyamine-polyepoxide resin in the gas barrier coating.

The pigments typically used in tinting gas barrier coatings for use in multilayer packaging materials for the malt beverage industry can be any suitable particulate pigment and/or dye which has the following properties: it substantially blocks the aforementioned product damaging light; it results in a glossy, transparent gas barrier coating; and it does not significantly adversely affect the gas barrier properties of the resulting gas barrier coating. Examples of dyes which can be used for this purpose include brown dyes, amber dyes and/or a blend of red and yellow dyes. Examples of pigments which can be used for this purpose include brown pigments, amber pigments and/or a blend of red and yellow pigments. Preferably, pigments are used since they typically improve the OPC value of the resulting tinted coating. A preferred pigment is iron oxide since it imparts a dark amber color which closely matches the color of most conventional glass beer bottles.

EXAMPLES

The present invention is more particularly described in the following examples which are intended as illustration only and are not intended to limit the scope thereof. Unless otherwise indicated, all weight percentages are based on the total weight of all the ingredients of the barrier coating being shown in the example.

Example I

This is an example of a multilayer packaging material prepared in accordance with the present invention.

A gas barrier coating was prepared by stirring together, in a suitable container, the following ingredients: 12.5 weight percent GASKAMINE® 328 (a reaction product of m-xylylenediamine and epichlorohydrin commercially available from Mitsubishi Gas Chemical Co.), 17.3 weight percent of DEN-444 (a novolac epoxy resin commercially available from Dow Chemical Co.), 63.1 weight percent DOWANOL® PM solvent (1-methoxy- 2-propanol commercially available from Dow Chemical Co.), 5.8 weight percent of methyl ethyl ketone, 0.1 weight percent SF-1023, and 1.2 weight percent of deionized water. The resulting homogeneous blend was allowed to stand at room temperature for about 15 minutes before use.

Multilayer containers were made by spray applying the gas barrier coating of this example onto 2-liter PET containers, and then curing the coating for 8 minutes at 145° F. (63° C.) to yield a dry coating having a thickness ranging from 0.3 to 0.5 mil. The cured film of the gas barrier coating had a theoretical nitrogen content of about 7.1 weight percent.

Example II

This is an example of a multilayer packaging material prepared in accordance with the present invention.

An ungelled polyamine adduct was prepared as follows: A reaction vessel was charged with 1 mole (136 grams) of m-xylylenediamine ("MXDA") and 330 grams of 1-methoxy-2-propanol. The admixture was heated to 100° C. under a nitrogen atmosphere. Thereafter, a mixture of 0.285 mole (112 grams) of TETRAD X epoxy resin, commercially available from Mitsubishi Gas Chemical Co., and 248 grams of 1-methoxy-2-propanol was added over 1 hour.

The reaction mixture was held at 100° C. for a total of about 2 hours. The resultant polyamine adduct had a theoretical molecular weight of about 900, a theoretical percent solids of 30.0, and a theoretical amine hydrogen equivalent weight of about 88.

A gas barrier coating was then prepared by stirring together, in a suitable container, the following ingredients: 68.1 weight percent of the polyamine adduct solution from above, 9.4 weight percent of TETRAD X epoxy resin, 16.1 weight percent of DOWANOL® PM solvent, 5.1 weight percent of ethyl acetate, 1.2 weight percent of deionized water, and 0.1 weight percent of SF-1023. The resulting homogeneous mixture was allowed to stand at room temperature for about 15 minutes before use.

Multilayer containers were made by spray applying the gas barrier coating of this example onto 2-liter PET containers, and then curing the coating for 15 minutes at 145° F. (63° C.) to yield a dry coating having a thickness ranging from 0.3 to 0.5 mil. The cured film of the gas barrier coating had a theoretical nitrogen content of about 12.1 weight percent.

Example III

This is an example of a multilayer packaging material prepared in accordance with the present invention. In this example, Mica M RP, a gray powder muscovite mica from EM Industries, was used as a filler.

The particle size distribution of Mica M RP was determined by the use of a HORIBA LA-900 laser scattering particle size distribution analyzer as follows: 1 to 2 grams of Mica M RP was added to a beaker containing 10 to 15 milliliters of 1-methoxy-2 propanol which was used as the dispersing agent. This mixture was then stirred vigorously for approximately 1 minute to form a dispersion. Thereafter, the beaker containing the dispersion was placed in an ultrasonic bath for approximately 1 minute to disperse any air trapped between the Mica M RP particles and dispersing agent.

The HORIBA LA-900 laser scattering particle size distribution analyzer was then calibrated by filling a fraction cell supplied with the apparatus with 1-methoxy-2 propanol, placing the filled fraction cell in the appropriate analyzing chamber of the HORIBA LA-900 laser scattering particle size distribution analyzer, and analyzing the sample.

Thereafter, an identical fraction cell used to calibrate the machine was filled with a sample of the dispersion containing the Mica M RP. The fraction cell was then placed in the appropriate analyzing chamber of the HORIBA LA-900 laser scattering particle size distribution analyzer and analyzed. The analyzing chamber is equipped with an ultrasonic bath which is designed the keep the dispersed particles in motion during their analysis. The results of this analysis indicated that Mica M RP sample had the following particle size distribution: a number mean particle diameter of about 9.8, a volume mean particle diameter of about 14.6, at least about 95 percent of its particles greater than 7 microns, and less than 1.5 percent of its particles greater than 30 microns.

A filler dispersion was prepared as follows: 1,000 grams of the polyamine adduct solution from Example II was blended with 10.6 grams of A-1100 aminosilane (commercially available from OSi Specialties). To this mixture was added 531 grams of Mica M RP. This mixture was then stirred with a high speed Cowles mixer for about 15 minutes.

A gas barrier coating was then prepared by stirring together, in a suitable container, the following ingredients: 9.3 weight percent of the above filler dispersion, 44.6 weight percent of the polyamine adduct solution from Example II, 7.0 weight percent of TETRAD X epoxy resin, 34.6 weight percent of DOWANOL® PM solvent, 3.7 weight percent of ethyl acetate, 0.7 weight percent of 2-butoxy ethanol, and 0.1 weight percent of SF-1023. The resulting mixture was allowed to stand at room temperature for about 15 minutes prior to use.

Multilayer containers were made by spray applying the gas barrier coating of this example onto 2-liter PET containers, and then curing the coating for 15 minutes at 145° F. (63° C.) to yield a dry coating having a thickness ranging from 0.3 to 0.5 mil. The resulting cured film of the pigmented gas barrier coating had a theoretical nitrogen content of about 10.9 weight percent.

Example IV

This is an example of a multilayer packaging material prepared in accordance with the present invention.

A gas barrier coating was prepared by stirring together, in a suitable container, the following ingredients: 18.9 weight percent GASKAMINE® 328S (GASKAMINE® 328 which has been vacuum stripped to remove free MXDA), 17.5 weight percent of TETRAD X epoxy resin, 62.3 weight percent of DOWANOL® PM solvent, 1.2 weight percent of deionized water, and 0.1 weight percent of SF-1023. The resulting homogeneous mixture was allowed to stand at room temperature for about 15 minutes prior to use.

Multilayer containers were made by spray applying the gas barrier coating of this example onto 2-liter PET containers, and then curing the coating for 30 minutes at 145° F. (63° C.) to yield a dry coating having a thickness ranging from 0.3 to 0.5 mil. The resulting cured film of the gas barrier coating had a theoretical nitrogen content of about 12.7 weight percent.

Example V (Comparative)

This is an example of a multilayer packaging material outside the scope of the present invention. Specifically, in this example, the initial polyamine employed in making the gas barrier coating does not have at least 50% of its carbon atoms in an aromatic ring.

An ungelled polyamine adduct was prepared as follows. A reaction vessel was charged with 1 mole (189 grams) of tetraethylenepentamine and 1161 grams of 1-methoxy-2-propanol. The admixture was heated to 100° C. under a nitrogen atmosphere, and a mixture of 0.857 mole (322 grams) of EPON 880 epoxy (4,4'-isopropylidenediphenol/epichlorohydrin available from Shell Chemical Co.) and 1979 grams of DOWANOL® PM solvent was added over 1 hour.

The reaction mixture was held at 100° C. for a total of about 2 hours. The mixture was then cooled to 70° C. and vacuum stripped. The resultant polyamine adduct had a theoretical molecular weight of about 3,600, a percent solids as measured at 110° C. for one hour of 30.1, and a theoretical amine hydrogen equivalent weight of about 98.

Thereafter, in a suitable container, the following ingredients were mixed together: 22.0 weight percent of the polyamine adduct from above, 64.1 weight percent of DOWANOL® PM solvent, 0.1 weight percent SF-1023 silicone surfactant commercially available from General Electric Co., 1.7 weight percent of 2 butoxy ethanol, 10.6 weight percent of toluene, and 1.5 weight percent of deionized water. The resulting homogeneous blend is hereinafter referred to as "Component A." All aforementioned weight percentages of Component A are based upon the total weight of all ingredients in Component A.

Then, 52.5 weight percent of EPON 880, and 47.5 weight percent of DOWANOL® PM solvent were stirred together. The resulting homogenous blend is hereinafter referred to as "Component B." All aforementioned weight percentages of Component B are based upon the total weight of all ingredients in Component B.

A gas barrier coating was then prepared by blending Components A and B together at a ratio of 5:1 by volume. The resulting homogeneous blend was permitted to stand at room temperature for about one hour before use.

Multilayer containers were made by spray applying the gas barrier coating of this example onto 2-liter containers made from PET, and then curing the coating for 8 minutes at 145° F. (63° C.) to yield a dry film thickness ranging from 0.3 to 0.5 mil. The cured film of the gas barrier coating had a theoretical nitrogen content of about 10.5 weight percent.

Example VI (Comparative)

This is an example of a multilayer packaging material outside the scope of the present invention. Specifically, in this example, the initial polyamine employed in making the gas barrier coating does not have at least 50% of its carbon atoms in an aromatic ring.

A gas barrier coating was prepared by stirring together, in a suitable container, the following ingredients: 15.6 weight percent of the polyamine adduct from Example V, 19.4 weight percent of EPON 880, 40.4 weight percent of DOWANOL® PM solvent, 0.2 weight percent SF-1023, 2.5 weight percent of 2-butoxy ethanol, 18.5 weight percent of toluene, and 3.4 weight percent of deionized water. The resulting homogeneous blend was allowed to stand at room temperature for about one hour before use.

Multilayer containers were made by spray applying the gas barrier coating of this example onto 2-liter PET containers, and then curing the coating for 8 minutes at 145° F. (63° C.) to yield a dry coating having a thickness ranging from 0.3 to 0.5 mil. The cured film of the gas barrier coating had a theoretical nitrogen content of about 7.1 weight percent.

Example VII (Comparative)

This is an example of a multilayer packaging material outside the scope of the present invention. Specifically, in this example, the cured film of the gas barrier coating had a theoretical nitrogen content which was not greater than about 6.0 weight percent.

A gas barrier coating was prepared by stirring together, in a suitable container, the following ingredients: 7.0 weight percent GASKAMINE® 328, 26.3 weight percent DEN-444, 611.1 weight percent DOWANOL® PM solvent, 7.6 weight percent methyl ethyl ketone, 1.2 weight percent deionized water, and 0.1 weight percent SF-1023. The resulting homogeneous blend was allowed to stand at room temperature for about 15 minutes before use.

Multilayer containers were made by spray applying the gas barrier coating of this example onto 2-liter PET containers, and then curing the coating for 8 minutes at 145° F. (63° C.) to yield a dry coating having a thickness ranging from 0.3 to 0.5 mil. The cured film of the gas barrier coating had a theoretical nitrogen content of about 4.0 weight percent.

Example VII (Comparative)

This is an example of a multilayer packaging material outside the scope of the present invention. Specifically, in this example, the cured film of the gas barrier coating had a theoretical nitrogen content which was not greater than about 6.0 weight percent.

A gas barrier coating was prepared by stirring together, in a suitable container, the following ingredients: 9.6 weight percent of GASKAMINE® 328, 20.4 weight percent of DEN 444, 61.9 weight percent of DOWANOL® PM solvent, 6.7 weight percent of methyl ethyl ketone, 1.2 weight percent of deionized water, and 0.1 weight percent of SF-1023. The resulting homogeneous mixture was allowed to stand for about 15 minutes prior to use.

Multilayer containers were made by spray applying the gas barrier coating of this example onto 2-liter PET containers, and then curing the coating for 10 minutes at 145° F. (63° C.) to yield a dry coating having a thickness ranging from of 0.3 to 0.5 mil. The resulting cured film of the gas barrier coating had a theoretical nitrogen content of about 5.5 weight percent.

Example IX (Comparative)

This is an example of a multilayer packaging material outside the scope of the present invention. Specifically, in this example, the gas barrier coating was made from a commercially available polyvinlyidene chloride polymer.

A comparative gas barrier coating was prepared by stirring together, in a suitable container, the following material: 9.7 weight percent F-239, a polyvinylidine chloride polymer commercially available from Dow Chemical Co., 36.3 weight percent tetrahydrofurane, 19.3 weight percent toluene, and 35.0 weight percent cyclohexanone. The homogeneous blend was then spray applied onto 2-liter PET containers, and cured for 60 minutes at 145° F. (63° C.) to yield a dry coating having a thickness ranging from 0.2 to 0.3 mil.

Example X (Comparative)

This is an example of a multilayer packaging material outside the scope of the present invention. Specifically, in this example, the gas barrier coating was made from a commercially available ethyl vinyl alcohol ("EVOH") polymer.

A PET/ethyl vinyl alcohol film/PET laminate multilayer container construction was simulated by wrapping a 0.65 mil ethyl vinyl alcohol film (EVAL® EF-F commercially available from EVAL Corporation of America) tightly around 2-liter PET containers and sealing the edges with tape. Second layers of PET were cut from the walls of other 2-liter PET containers and, thereafter, wrapped over the EVOH film and secured with tape.

CARBON DIOXIDE TREATMENT OF MULTILAYER CONTAINERS

One sample of each of the coated 2-liter PET containers of Examples I through X and one uncoated 2-liter PET container was treated with carbon dioxide by filling each bottle with the following mixture: 2,000 grams of water at a temperature of about 40° F. (5° C.), 28.8 grams of sodium carbonate, and 38.4 grams of citric acid. The filled containers were quickly capped and gently agitated to mix the ingredients. This mixture provided a level of carbonation equivalent to about 3 volumes of carbon dioxide. All sealed samples were conditioned by being stored for 3 weeks at about 70° F. (21° C.) prior to testing.

After the conditioning period, the carbonated sample containers were opened and emptied. Samples for testing were cut from the walls of the coated and uncoated PET containers. In the case of the PET/EVOH/PET container (i.e., Example X), the EVOH film was removed and tested by itself. Samples of each of the examples which had not been carbon dioxide treated were similarly prepared for testing.

Each of the samples were tested for oxygen transmission rate at 30° C. and at test conditions of 50 to 55% and 70 to 75% R.H. utilizing an OXTRAN 2/20 from Modern Controls, Inc.

Oxygen permeability constants for each of the samples were then calculated using the following equation:

$$1/R_1 = 1/R_2 + DFT/Po_2$$

where:

$R^1$ = coated PET transmission rate in cc/100 in²/atmosphere/day;

$R^2$ = PET film transmission rate in cc/100 in²/atmosphere/day;

DFT = coating dry film thickness in mils; and $Po_2$ = OPC value of coating in cc-mil/100 in²/atmosphere/day.

These oxygen permeability constants are listed in TABLE 1 present invention (i.e., Examples I through IV) had a post-treatment OPC value at 30° C. and about 50% R.H. which was not more than 0.05. On the other hand, the $CO_2$-treated multilayer packaging materials made in accordance with the comparative examples (i.e., Examples V through X) had a post-treatment OPC value at 30° C. and about 50% R.H. which was 0.06 or greater.

TREATMENT OF BARRIER LAYERS WITH VARYING LEVELS OF CARBON DIOXIDE

The following tests show the effect of treating a multilayer packing material made in accordance with the present invention with varying volumes of carbon dioxide.

Multilayer containers were prepared as in Example III. A first multilayer container was not treated with any carbon dioxide, and a second through fifth container was treated with varying levels of carbon dioxide. These test samples are referred to as IIIa, IIIb, IIIc, IIId, and IIIe, respectively.

Example IIIb was treated with a carbonated solution made up of 2,000 grams of water at a temperature of about 40° F. (5° C.), 4.8 grams sodium carbonate and 6.4 grams of citric acid to produce a carbonation equivalent of 0.5 volume of carbon dioxide. Example IIIc was treated with a carbonated solution made up of 2,000 grams of water at a temperature of about 40° F. (5° C.), 9.6 grams sodium carbonate and 12.8 grams of citric acid to produce a carbonation equivalent of 1.0 volume of carbon dioxide. Example IIId was treated with a carbonated solution made up of 2,000 grams of water at a temperature of about 40° F. (5° C.), 19.3 grams sodium carbonate and 25.7 grams of citric acid to produce a carbonation equivalent of 2.0 volumes of carbon dioxide. Example IIIe was treated with a carbonated solution made up of 2,000 grams of water at a temperature of about 40° F. (5° C.), 28.8 grams of sodium carbonate and 38.4 grams of citric to produce a carbonation equivalent of 3.0 volumes of carbon dioxide All samples were conditioned by being stored for 3 weeks at about 70° F. (21° C.) prior to testing. After the conditioning period, the carbonated sample containers were opened and emptied. Samples for testing were cut from the walls of the coated and uncoated PET containers. Each of the samples were then tested for oxygen transmission rate as described above. OPC values were calculated as described above. These results are listed in TABLE 2.

TABLE 1

| | | OPC Value At 50-55% Relative Humidity | | OPC Value At 70-75% Relative Humidity | |
| --- | --- | --- | --- | --- | --- |
| | | Without | With | Without | With |
| Example | Nitrogen Content | Carbonation | Carbonation | Carbonation | Carbonation |
| I | 7.1 | 0.3 | 0.05 | 0.54 | 0.09 |
| II | 12.1 | 0.1 | 0.03 | 0.17 | 0.06 |
| III | 10.9 | 0.04 | 0.01 | 0.04 | 0.01 |
| IV | 12.7 | 0.1 | 0.01 | 0.27 | 0.03 |
| V | 10.5 | 1.02 | 0.12 | 1.79 | 0.74 |
| VI | 7.1 | 1.8 | 0.84 | 1.32 | 0.88 |
| VII | 4.0 | 1.03 | 1.08 | 0.82 | 1.16 |
| VIII | 5.5 | 0.43 | 0.16 | 0.46 | 0.21 |
| IX | N/A | 0.8 | 0.42 | 0.7 | 0.41 |
| X | N/A | 0.03 | 0.06 | 0.17 | 0.21 |
| PET | N/A | 6.0 | 6.27 | 5.78 | 6.0 |

As can be seen from the data in TABLE 1, the $CO_2$-treated multilayer packaging materials made in accordance with the

TABLE 2

| Example | Volumes of $CO_2$ used in Treatment | OPC Value At 50-55% Relative Humidity | OPC Value At 70-75% Relative Humidity |
| --- | --- | --- | --- |
| IIIa | None | 0.04 | 0.04 |
| IIIb | 0.5 | 0.02 | 0.02 |
| IIIc | 1.0 | 0.02 | 0.03 |
| IIId | 2.0 | 0.02 | 0.02 |
| IIIe | 3.0 | 0.01 | 0.01 |

As can be seen from the data in TABLE 2, the volume of carbon dioxide used in treating the multilayer packing material has little effect on the packaging material's resulting OPC value.

Example XI

This is an example of a multilayer packaging material prepared in accordance with the present invention which is in the form of sheet stock.

The gas barrier coating of Example II was applied onto 2 mil PET film with a 028 wire wound draw down bar and cured at 145° F. (63° C.) for 15 minutes to yield a dry coating having a thickness of about 0.5 mil. The coated PET sample was placed into a 3 gallon (11.5 liter) pressure vessel containing a small open container of saturated $Ca(NO_3)_2$ solution to maintain an atmosphere of about 50% R.H. The vessel was tightly closed and pressurized to 4 bars with $CO_2$ gas.

The pressurized vessel containing the coated samples was stored at ambient temperature for 11 days. Thereafter, it was opened, and the coated PET film samples were removed.

The samples were tested for oxygen permeability. Their permeability constants were calculated in the same manner as described above. The OPC value for the carbon dioxide treated coating was 0.05 at 30° C. and 55% R.H. As shown above in TABLE 1, the barrier coating of Example II had an OPC value of 0.1 before $CO_2$ treatment.

It is evident from the foregoing that various modifications, which are apparent to those skilled in the art, can be made to the embodiments of this invention without departing from the spirit or scope thereof. Having thus described the invention, it is claimed as follows.

We claim:

1. A tinted multilayer packaging material which blocks at least 90% of light with wavelengths of electromagnetic radiation ranging from 300 nanometers to 500 nanometers comprising:
   (a) at least one layer of a carbon dioxide-permeable packaging material, and
   (b) at least one layer of a carbon dioxide-treated gas barrier coating having an OPC value not more than about 0.05 when measured at about 30° C. and about 50% relative humidity which is the reaction product of polyamine (A) and polyepoxide (B), wherein polyamine (A) comprises at least one selected from the group consisting of:
      (a) an initial polyamine containing at least 50 percent of the carbon atoms in one or more aromatic rings, and
      (b) an ungelled amine-epoxide adduct having active amine hydrogens which is the reaction product of the initial polyamine and at least one selected from the group consisting of:
         (i) epichlorohydrin, and
         (ii) a polyepoxide having a plurality of glycidyl groups linked to an aromatic member.

2. The tinted multilayer packaging material of claim 1 wherein the carbon dioxide-permeable packaging material is tinted such that it blocks at least 90% of light with wavelengths of electromagnetic radiation ranging from 300 nanometers to 500 nanometers and the carbon dioxide-treated gas barrier coating is not tinted in a manner which blocks at least 90% of light with wavelengths of electromagnetic radiation ranging from 300 nanometers to 500 nanometers.

3. The tinted multilayer packaging material of claim 1 wherein the carbon dioxide-permeable packaging material is not tinted in a manner which blocks at least 90% of light with wavelengths of electromagnetic radiation ranging from 300 nanometers to 500 nanometers and the carbon dioxide-treated gas barrier coating is tinted such that it blocks at least 90% of light with wavelengths of electromagnetic radiation ranging from 300 nanometers to 500 nanometers.

4. The tinted multilayer packaging material of claim 3 wherein the carbon dioxide-treated gas barrier coating is tinted brown or dark amber.

5. The tinted multilayer packaging material of claim 3 wherein carbon dioxide-treated gas barrier coating is tinted with iron oxide pigment.

6. The tinted multilayer packaging material of claim 1 wherein the carbon dioxide-treated gas barrier coating has an OPC value not greater than about 0.03 when measured at about 30° C. and about 50% relative humidity.

7. The tinted multilayer packaging material of claim 1 wherein the carbon dioxide-permeable packaging material comprises at least one selected from the group consisting of: polyester, polyolefin, polyamide, cellulosic, polystyrene and polyacrylic.

8. The tinted multilayer packaging material of claim 1 wherein the carbon dioxide-permeable packaging material comprises a polyester.

9. The tinted multilayer packaging material of claim 8 wherein the carbon dioxide-permeable packaging material comprises at least one selected from the group consisting of: poly(ethylene terephthalate) and poly(ethylene napthalate).

10. The tinted multilayer packaging material of claim 1 wherein the initial polyamine is represented by the structure:

where:

k is 1.5 or greater,

Φ is an aromatic-containing compound, and $R^1$ is an alkyl group having between 1 and 4 carbon atoms.

11. The tinted multilayer packaging material of claim 10 wherein k is 1.9 or greater and $R^1$ is an alkyl group which is not greater than $C_2$.

12. The tinted multilayer packaging material of claim 1 wherein about 10 to about 80 percent of the ungelled amine-epoxide adduct's active amine hydrogens are reacted with epoxy groups prior to reacting the ungelled amine-epoxide adduct with polyepoxide (B).

13. The tinted multilayer packaging material of claim 1 wherein polyamine (A) comprises an ungelled amine-epoxide adduct which is the reaction product of the initial polyamine and epichlorohydrin.

14. The tinted multilayer packaging material of claim 1 wherein the initial polyamine comprises m-xylylenediamine.

15. The tinted multilayer packaging material of claim 1 wherein polyamine (A) comprises an ungelled amine-epoxide adduct which is the reaction product of the initial polyamine and a polyepoxide having a plurality of glycidyl groups linked to an aromatic member.

16. The tinted multilayer packaging material of claim 1, wherein the polyepoxide having a plurality of glycidyl groups linked to an aromatic member is represented by the structure:

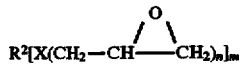

where:

$R^2$ is phenylene or naphthylene;

X is N, $NR^3$, $CH_2N$, $CH_2NR^3$, O, and/or C(O)—O, where $R^3$ is an alkyl group containing 1 to 4 carbon atoms, a cyanoethyl group or cyanopropyl group;

n is 1 or 2; and m is 2 to 4.

17. The tinted multilayer packaging material of claim 16 wherein the polyepoxide having a plurality of glycidyl groups linked to an aromatic member comprises at least one selected from the group consisting of: N,N,N',N'-tetrakis(oxiranylmethyl)-1,3-benzene dimethanamine, resorcinol diglycidyl ether, diglycidyl esters of phthalic acid and triglycidyl para-aminophenol.

18. The tinted multilayer packaging material of claim 1 wherein polyepoxide (B) comprises a polyepoxide having a plurality of glycidyl groups linked to an aromatic member.

19. The tinted multilayer packaging material of claim 18 wherein polyamine (A) comprises m-xylylenediamine.

20. The tinted multilayer packaging material of claim 18 wherein the polyepoxide having a plurality of glycidyl groups linked to an aromatic member is represented by the structure:

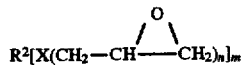

where:

R$^2$ is phenylene or naphthylene;

X is N, NR$^3$, CH$_2$N, CH$_2$NR$^3$, O, and/or C(O)—O, where R$^3$ is an alkyl group containing 1 to 4 carbon atoms, a cyanoethyl group or cyanopropyl group;

n is 1 or 2; and m is 2 to 4.

21. The tinted multilayer packaging material of claim 20 wherein the polyepoxide having a plurality of glycidyl groups linked to an aromatic member comprises at least one selected from the group consisting of: N,N,N',N'-tetrakis (oxiranylmethyl)-1,3-benzene dimethanamine, resorcinol diglycidyl ether, diglycidyl esters of phthalic acid and triglycidyl para-aminophenol.

22. The tinted multilayer packaging material of claim 1 wherein the reaction product of polyamine (A) and polyepoxide (B) comprises filler (C) which comprises a platelet-type filler with the following particle size distribution:

(i) a number mean particle diameter in the range from about 5.5 to about 15 microns, and (ii) a volume mean particle diameter in the range from about 8 to about 25 microns.

23. The tinted multilayer packaging material of claim 1 wherein the carbon dioxide-permeable packaging material is a sealable container.

24. The tinted multilayer packaging material of claim 23 wherein the carbon dioxide-permeable packaging material is a carbonated alcoholic beverage container.

* * * * *